A. M. MAYLE.
MOTION PICTURE APPARATUS.
APPLICATION FILED MAY 14, 1919.

1,381,727.

Patented June 14, 1921.
3 SHEETS—SHEET 1.

Albert M Mayle
Inventor

By Geo Kirk
Attorney

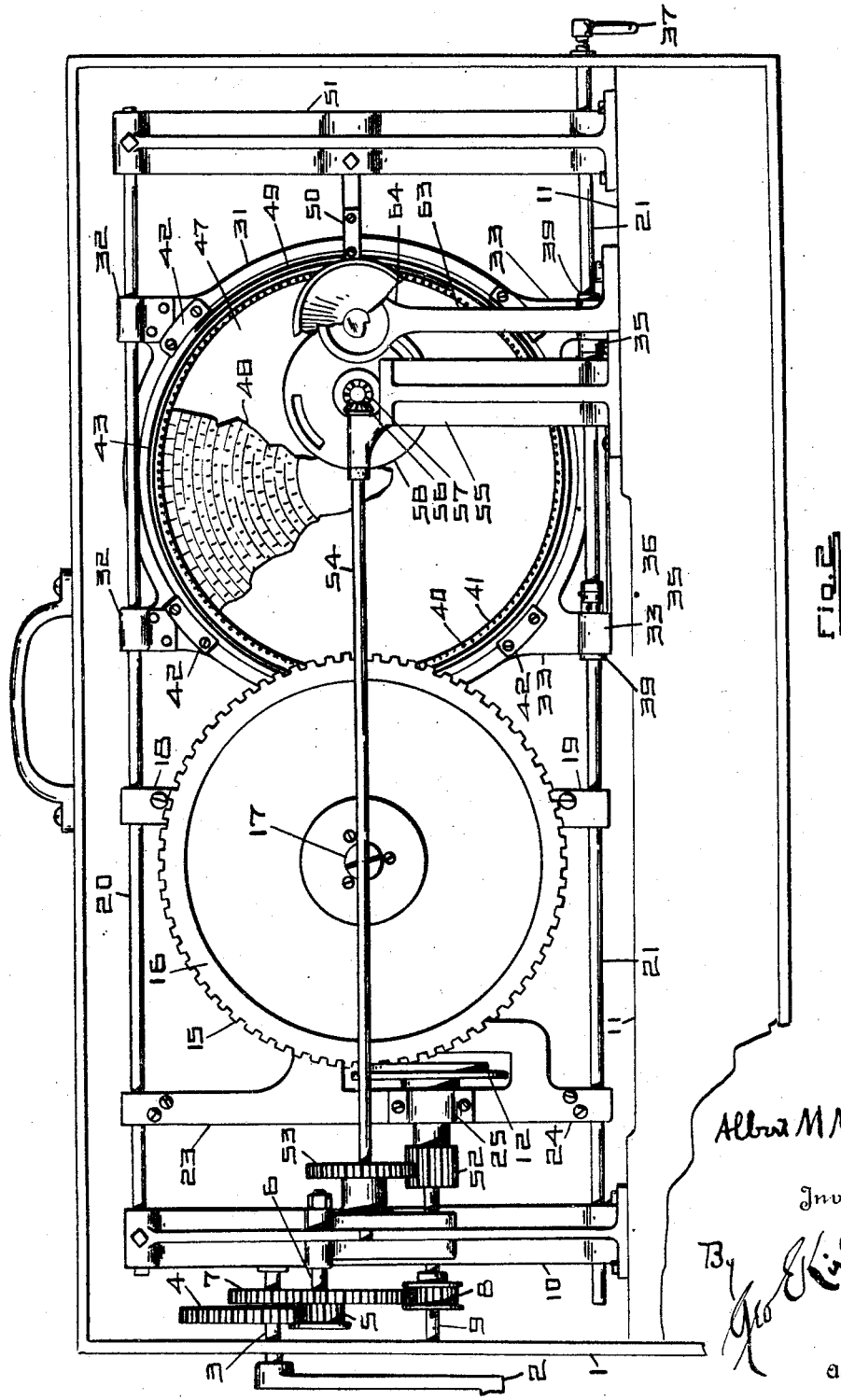

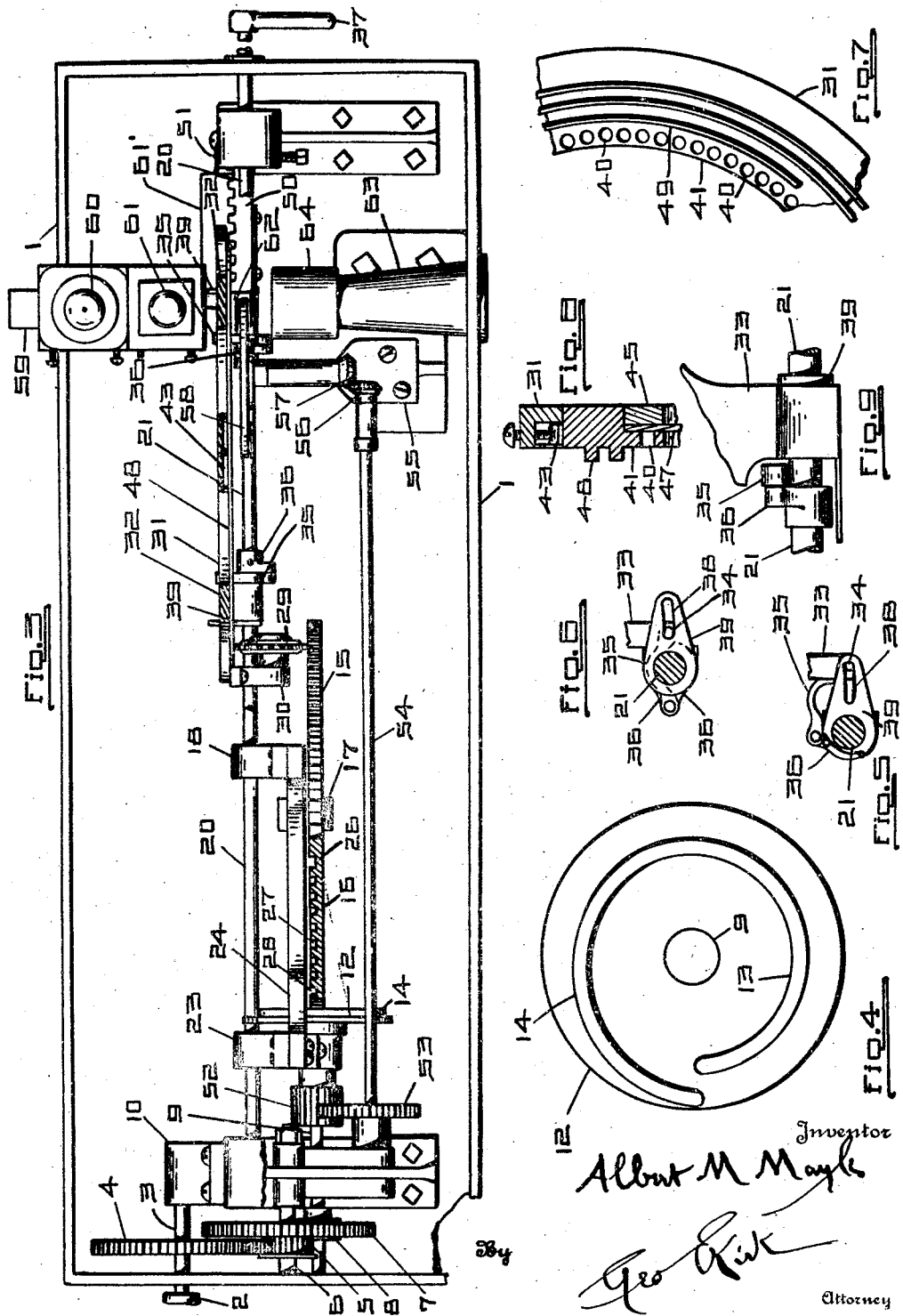

UNITED STATES PATENT OFFICE.

ALBERT M. MAYLE, OF TOLEDO, OHIO.

MOTION-PICTURE APPARATUS.

1,381,727.  Specification of Letters Patent.  Patented June 14, 1921.

Application filed May 14, 1919. Serial No. 296,987.

*To all whom it may concern:*

Be it known that I, ALBERT M. MAYLE, a citizen of the United States of America, residing at Toledo, Lucas county, Ohio, have invented new and useful Motion-Picture Apparatus, of which the following is a specification.

This invention relates to intermittent actuation of a member.

This invention has utility when incorporated in motion picture apparatus, more particularly in connection with a disk film or record.

Referring to the drawings:

Fig. 2 is a view of the motion picture apparatus of Fig. 1 from the opposite side, with the housing on such side removed;

Fig. 3 is a plan view, with parts broken away, of the apparatus of Fig. 1;

Fig. 4 is a view of the continuous rotation driving or holding cam;

Fig. 5 is a detail view of the shifting device for the record holder out of transmission mechanism engaging position;

Fig. 6 is a view of the apparatus of Fig. 5 as held in transmission mechanism engaging position;

Fig. 7 is a fragmentary view of the rotary holder and its shiftable carrier;

Fig. 8 is a section on the line VIII—VIII, Fig. 1, and

Fig. 9 is a view from the left of Fig. 6.

Figure 1:
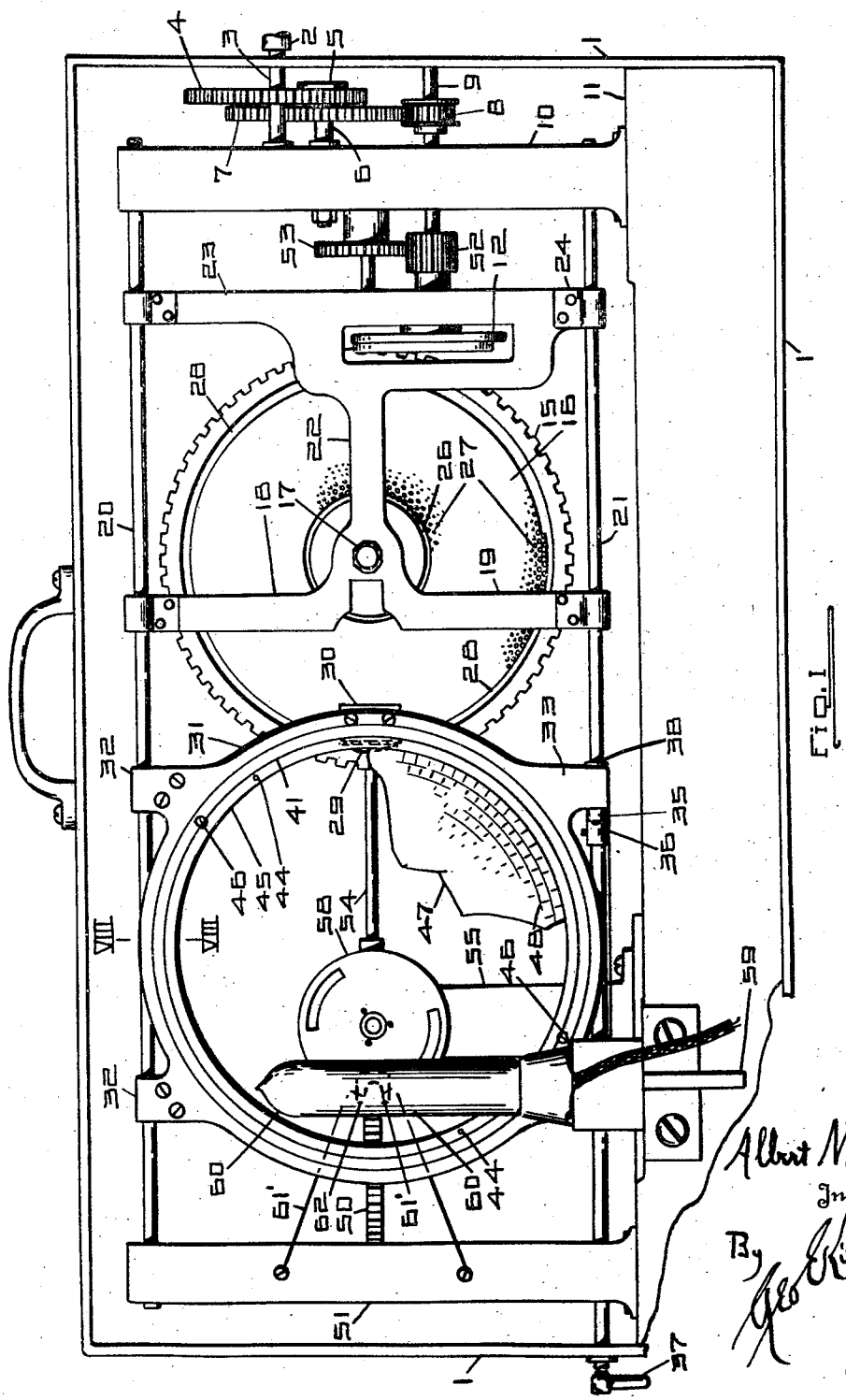
Figure 1 is a side elevation of an embodiment of the invention as a disk motion picture apparatus, portions being broken away.

At one end of a main housing or box 1 there may be a crank 2 mounted upon shaft 3 extending into the housing 1. In the event of hand operation instead of motor driving, it is desirable to have a speeding up of the transmission, and accordingly speeding up gearing from the shaft 3 is provided, by means of a gear 4 in mesh with pinion 5 on shaft 6 which carries gear 7 in mesh with pinion 8 upon main drive shaft 9 mounted in bracket 10 with the shaft 6 and carried on base 11 in the housing 1.

This main shaft 9 of the driving means has at its inner extremity a disk 12 having thereon an inwardly extending rib (Fig. 4), the concentric or major portion 13 of which terminates in a shorter or minor eccentric portion 14. This radial cam 13, 14, actuated by the shaft 9 is in engagement with annular series of teeth 15 on actuator disk 16 mounted in bearings 17, having upwardly projecting arm 18, and downwardly projecting arm 19. These arms 18, 19, respectively, are mounted upon slide rods 20, 21, extending longitudinally of the housing 1 and parallel with each other. This bracket for the shaft 17 comprising the arms 18, 19, also has arm 22 extending horizontally toward the disk 12 of this cam 13, 14. This portion 22 of the bracket has upwardly extending arm 23 having bearing on the shaft 20, and downwardly extending arm 24 having bearing on the shaft 21. This arm 24 of the bracket also carries bearing 25 for the shaft 9.

There is accordingly provided a frame comprising the arms 18, 19, 23, 24, with the intermediate connecting arm 22 carrying as a slidable unit the bearing 17 having the actuator disk 16 and the shaft 9 as mounted in the bearing 25. The unit is slidable on the rods 20, 21. This actuator disk 16 on the side thereof adjacent the bracket arms 18, 19, has centrally a groove 26 from which extends a spiral 27 of engaging means which peripherally terminate in a groove 28. These grooves 26 and 28 provide inner and outer termini for the intermediate spiral of engaging means 27. These grooves 26, 28, are endless and serve as guides for starting at either terminus or as continuation means if there be travel beyond engaging means terminus in either direction. The engaging means 27 in this instance are shown as recesses or openings and according to the arrangement as herein shown they vary in number in each round but are uniformly spaced. The inner series may run from sixty while the outer may run say to one hundred seventy. As the distance from the center increases the number of recesses gradually increases and there is thus a progressive change from a minimum at the center to a maximum toward the outer edge.

Engaging with these recesses of the spiral or scroll 27 is an intermediate transmission mechanism or pinion 29 mounted in bearing 30 carried by carrier or ring holder 31 which has on its upper portion a pair of ears 32 having bearings on the shaft 20. Extending downwardly from this carrier 31 is a pair of ears 33 (Figs. 5, 6) each having a pin 34 therein engaged by an arch link 35 carried by a crank 36 fast on the shaft 21, as a longitudinally slidable guide bar. The shaft 21 may be rocked by means of handle 37, shown in this instance as on the end of this shaft 21 remote from the operating crank 2. This crank 37 in its oscillation may rock the carrier or holder 31 toward or from the shaft 21 upon the shaft 20 as a bearing. The arching of the link 35 between the crank arm 36 and the pin 34 permits of a close shifting, and a falling of this link 35 about the shaft 21 as a locking means serves to hold the carrier 31 in its position adjacent the shaft 21. In this position (Fig. 6) the intermediate transmission mechanism or gear 29 is held in meshing engagement with the spiral series of recesses 27. While in the outward thrown position of Fig. 5, this driving connection is out of meshing engagement and accordingly the intermediate mechanism 29 is idle. Adjacent each pin 34 of the gear or bracket 33 from the member 31 is a guide slot 38 carried by a bracket 39 on the shaft 21 serving to direct the action of the pin 34 in its travel toward and from the shaft 21.

The intermediate gear 29 has its teeth serve as seat means in mesh with an endless annular series of engaging seat means or openings 40 in a holder 41 carried by the ring 31 for positioning said holder in its travel along the guide rods 20, 21. This holder 41 is removably mounted in the carrier 31 by means of clips 42. Relative vibration of this holder 41 in the ring 31 is avoided by a spring 43 near the top of the carrier 31. (Fig. 8.)

This holder 41 is shown as having a pair of pins 44 (Fig. 1) out of diametric relation for mounting a ring 45 as a clamp by means of screws 46. This clamp ring 45 may thus hold a disk film or record 47 in position for taking thereon or projecting therefrom a spiral series of views 48. This film or record 47 has its center clear and may be as shown imperforate. Peripherally engaged by this clamp ring 45 as a mounting, this film 47 is operatively in engagement with the rotary holder 41 freely rotatable in and transversely shiftable with the carrier 31. It is to be noted the engagement of the film 47 is peripheral and in rotation there is thus a most positive holding against vibration at the greatest mechanical advantage and even for intermittent driving. The actuation of this holder 41 for rotation is from the gear wheel 29 which is remote from the axis of the disk or film 47, and is also remote from the axis of the holder 41 in which the disk is mounted and this distance is constant.

Furthermore the driving of the actuator disk 16 is peripheral or remote from its center by means of the continuously rotating cam 13, 14, engaging with the teeth 15. This means that the driving in each instance, for primary actuation of disk 16 or for the variable speed transmission through the mechanism of the intermediate gear 29, is at maximum holding mechanical advantage, and that accordingly any play or give in the mechanism is reduced to an absolute minimum.

To effect the transverse travel or shifting of the carrier 31 and with it the holder 41, 45, there is provided a groove or rib 49 shown as two complete rounds of a spiral, mounted on the carrier or holder member 41. Coacting with this groove or spiral 49 is a rack or tooth member 50 horizontally extending from fixed bracket 51 carried by base 11 in the housing 1. Accordingly as the carrier 41 operates for each rotation it is progressed one tooth of the member 50 and thus carries the annular series of views or subjects to be taken 48 on the record 47 a radially spaced relation on this record 47 inward sufficient for clearance.

The driving shaft 9 is designed to be operated continuously at a uniform annular velocity. Through the action of the cam 13, 14, there is an intermittent driving of the actuator disk 16, with the holding of the actuator disk 16 during the non-operating period. This holding is by the cam portion 13, while the driving is effected by the cam portion 14.

It may be assumed that for projecting or taking operation in the use of the record 47, the start is near the outer edge of such record or film. The position for the intermediate transmission mechanism or gear wheel 29, as to the disk 16 is at a point ready to leave the central groove 26 to start upon engagement with the spiral series of teeth 27 outward. This actuator disk 16 is always driven from the outside by the cam 13, 14. This means that the driving for the rotary holder 41 is at a lesser angular velocity of the intermediate gear wheel 29 when the tooth portion 27 is near the central groove 26. For one rotation of the actuator 16 with the wheel 29 in mesh therewith adjacent the central groove 26 there will be least rotation for each intermittent drive or step of the intermediate gear 29 with a minimum travel for the holder 41. Accordingly for one annular series of views to be taken or views to be projected on the film or record 41, there may be two or three or, that is, a plurality of rotations of the actuator 16 to one rotation of the holder 41. The spiral 49 holds this holder 41 so that the radial travel of the holder 41 is that provided by this groove 49 and toothed member 50 and is of just sufficient lead to give clearance of one round of views as to the next round thereof on the record 47. However, the intermediate transmission mechanism or gear 29 may have travel say two or three times around on the seat 27 before filling the outer round of disk 47. This traveling is permitted by the mounting of the actuator 16 in the frame 18, 19, 23, 24, to slide on the rods 20, 21. The bearing 25 is also slidable with such frame and carries the cam 13, 14, so that this cam on the shaft 9 is maintained in mesh with the actuator 16 during the plurality of rotations and continued operation. As the intermediate transmission mechanism or gear 29 works away from the center of the actuator 16 in following the spiral course of the teeth 27, its intermittent driving steps are of greater angular extent in the same time intervals. As the arc of rotation for each step of the wheel 29 is thus increased, the angular shifting transmitted by such wheel 29 to the rotary holder 41 is increased. This is an automatic means for approximating the same spacing between the views on the shorter radius portions of the record as maintains on the longer radius portions thereof. The time interval for travel and for rest or holding is constant in the intermittent drive throughout but the angular distance for shifting disk 47 is in the outer edge view region of starting at a minimum increasing therefrom uniformly. This brings about a practically uniform close spacing of the views throughout the record.

The slight longitudinal shifting of the actuator 16 to care for the variation in the progress of the intermediate gear 29 as to the shifting drive effective for the carrers 31 is taken into account in the actuation of the shaft 9 by having the gear 8 splined on the shaft 9 and this gear 8 is also provided with cheeks coacting with the driving gear 7 to keep it in mesh therewith.

Mounted on the shaft 9 is a long pinion 52 in mesh with a gear 53 for two to one speed reduction in driving a shutter shaft 54. This long pinion 52 takes care of the longitudinal travel of the shaft 9 in keeping this gear 52 in mesh with the gear 53. The shaft 54 extends to bracket 55 where this shaft 54 carries bevel pinion 56 in mesh with bevel pinion 57 for rotating the shutter 58.

Detachably mounted on the base 11 of the housing 1 is bracket 59 for carrying a light 60 and also a condenser 61. These are disposed to provide a light line through the shutter 58. There is also in this same line region a wire holder 61 for pressing the film or record 47 against a light line block 62. On the opposite side of the record or film 47 and adjacent the bracket 55 is a bracket 63 carrying a projecting lens 64 which may be adjustably mounted in the bracket 63 for caring for matters of focusing while the adjustment of the light and the condenser on the bracket 59 also take care of this problem.

From peripheral or maximum mechanical advantage engagement there is herein provided a continuous drive for effecting intermittent operation with a variable angular shifting between rests for closely associating the spiral series of views without overlapping throughout a maximum extent of a disk record. For instance with a six inch diameter disk and with one hundred seventy views in the outer spiral, the disk may be of a capacity to run for three minutes exposing at the rate of sixteen views per second.

What is claimed and it is desired to secure by Letters Patent is:

1. In a motion picture apparatus including a projecting lens, a light, a condenser between the light and lens, a disk record holder for positioning a record to receive light rays from the condenser, and a shutter to intercept rays from the light, a transmission mechanism peripherally engaging the record holder, embodying an actuator for progressively varying the angular velocity of the holder, and a driver for peripherally engaging the actuator.

2. In a record handling machine, a record holder, a guide therefor, transmission mechanism for actuating the holder, and means hinging the holder on the guide and operable for shifting the holder out of engagement with the transmission mechanism.

3. In a motion picture machine, a holder for a disk having positions thereon for a plurality of views, a rim mounting for the holder, and driving means for rotating the mounting, said driving means embodying an actuator engaging the mounting for shifting the holder progressively changing angular distances between views.

4. In a motion picture machine, a holder for a disk having positions thereon for a spiral series of views, and driving means for the holder comprising a rotary actuator for rotating the holder, said driving means embodying mechanism for varying the angular velocity of the actuator.

5. In a motion picture machine, means for peripherally mounting a disk record for a spiral series of views, and a constant speed driver provided with transmission mechanism embodying a speed varying device from said driver for rotating said means at variable distances between positions for views.

6. In a motion picture machine, a step by step actuated disk record mounting ring provided with means for peripherally engaging the record, ring engaging means coacting remotely from the axis of the record, and variable speed intermittent transmission mechanism coacting to vary the angular extent of the steps in the driving of said ring.

7. A motion picture machine comprising a mounting ring for disk records, said ring having a spiral seat disposed radially beyond the region of the record, driving means for rotating the record, and fixed means coacting with the seat in shifting the ring during ring rotation.

8. In a motion picture machine, a holder for a disk carrier for a series of views, means for rotating the holder, a guide on which the holder is slidable, said holder having seat means, and shifting means for the holder providing a seat engaging the holder seat for positioning the holder as to the guide in its sliding therealong.

9. In a picture machine, a driven member providing a holder for a record, and driving means peripherally engaging the member, said means comprising transmission mechanism effecting rotation and shifting of the member, including a first member provided with a spiral series of seats, and a relatively shiftable second member having seats coacting with the seats of the first member whereby a constant driving speed of the first member imparts a progressively changing speed for the second member for operating the holder providing driven member.

10. In a machine, a driven member, and driving means engaging the member, said means comprising transmission mechanism effecting rotation of the driven member, and including a first rotary member provided with a spiral series of seats, and a relatively shiftable second member having seats coacting with the seats of the first member, whereby a constant driving speed of the first member imparts a progressively changing speed for the second member for operating the driven member.

11. In a motion picture machine, a holder for a record, said holder having an endless series of teeth disposed peripherally thereof, and driving means comprising transmission mechanism coacting with said teeth and embodying a step by step driving device wherein the angular extent of the steps are varied.

12. In a motion picture machine, a holder having an endless series of teeth on the periphery thereof, driving means for rotating said holder including holding mechanism and comprising transmission mechanism coacting with said teeth and embodying a step by step driving device wherein the angular extent of the steps are varied.

13. In a motion picture machine, a holder for records, said holder having an endless series of teeth disposed peripherally thereof, and continuous rotation driving means for the holder, said driving means comprising transmission mechanism embodying an intermittent driving device provided with a radial cam having a major concentric portion and a minor eccentric portion, and a variable speed device actuated from said intermittent driving device to cause the variable speed device intermittently to actuate the holder for a different range of said teeth.

14. In a motion picture machine, a holder for records having a spiral series of views, driving means for rotating the holder, said driving means embodying an actuator eccentric of the holder for rotating the holder and including a speed varying device for varying the angular velocity of the actuator.

15. In a motion picture machine, peripheral mounting means for a spiral record, and driving means for the mounting means comprising transmission mechanism for rotating the mounting means including a continuous rotation radial cam having a major concentric portion coacting for holding, and a minor eccentric portion coacting for driving said holder, said mechanism including in addition to said cam, a variable speed device engaging the mounting means radially beyond the record.

16. In a motion picture machine, a disk record holder, an actuator for rotating the holder, a stationary guide for effecting shifting of the holder during rotation by coaction of the holder with the guide, driving means, transmission mechanism from the driving means for driving the holder through the actuator, said mechanism embodying a variable speed device traveling with the actuator, said actuator being shiftable to maintain coacting relation with the transmission mechanism, and said driving means having connections maintaining driving relation with the device during shifting thereof.

17. In a motion picture apparatus including a projecting lens, light, condenser, and shutter devices in alinement, mounting means for a centrally clear disk record, and intermittent driving means embodying an actuator for the mounting means, a driver, and transmission mechanism therebetween including a variable speed device connected to the actuator for rotating and progressing said record mounting means transversely of said alined devices, and an intermittent drive device for the variable speed device.

18. In a motion picture apparatus including a projecting lens, a light, a condenser and a shutter, a disk record mounting, a driven rim about the mounting, a rotary actuator engaging the rim, and a variable speed device for rotating and progressing said rim transversely of said alinement, and an intermittent drive device for the variable speed device.

19. In a motion picture apparatus including a projecting lens, a light, a condenser and a shutter, a disk record mounting, an actuator peripherally coacting with the mounting, driving means, and transmission mechanism between the actuator and driving means embodying a variable speed device for progressively varying the angular velocity of the mounting, and an intermittent drive device for the variable speed device.

20. In a motion picture machine, a disk record holder, a guide therefor, an actuator engaging the holder, driving means, transmission mechanism between the driving means and actuator, and means for shifting the holder out of transmission mechanism engagement independently of shifting the transmission mechanism.

21. In a motion picture machine a disk record holder, a guide therefor, an actuator for the holder, driving means, transmission mechanism between the driving means and holder, and holder shifting means for disconnecting the holder from driving relation with the mechanism independently of shifting the transmission mechanism.

In witness whereof I affix my signature.

ALBERT M. MAYLE.